United States Patent
Jin

(10) Patent No.: US 10,931,328 B2
(45) Date of Patent: Feb. 23, 2021

(54) UPSTREAM (US) FUNNELING NOISE SUPPRESSION

(71) Applicant: Cisco Technology, Inc., San Jose, CA (US)

(72) Inventor: Hang Jin, Plano, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/362,930

(22) Filed: Mar. 25, 2019

(65) Prior Publication Data

US 2020/0313721 A1    Oct. 1, 2020

(51) Int. Cl.
  *H04B 3/20*        (2006.01)
  *H04L 12/28*       (2006.01)
  *H04B 10/2507*     (2013.01)

(52) U.S. Cl.
  CPC ........... *H04B 3/20* (2013.01); *H04B 10/2507* (2013.01); *H04L 12/2801* (2013.01)

(58) Field of Classification Search
  None
  See application file for complete search history.

(56) References Cited

U.S. PATENT DOCUMENTS

| | | | |
|---|---|---|---|
| 10,505,571 B1* | 12/2019 | Yagil | H04B 1/10 |
| 2013/0095870 A1* | 4/2013 | Phillips | H04W 52/146 |
| | | | 455/501 |
| 2015/0208137 A1* | 7/2015 | Alrutz | H04N 7/102 |
| | | | 725/124 |
| 2016/0330011 A1* | 11/2016 | Lee | H04L 5/0066 |
| 2018/0076910 A1* | 3/2018 | Zhang | H04L 5/14 |
| 2018/0234275 A1* | 8/2018 | Miller | H04L 27/10 |
| 2020/0036463 A1* | 1/2020 | Kliger | H04B 3/20 |

* cited by examiner

*Primary Examiner* — Diane L Lo
(74) *Attorney, Agent, or Firm* — Merchant & Gould P.C.

(57) ABSTRACT

Upstream (US) funneling noise suppression may be provided. First, a signal comprising a plurality of mini-slots in a two dimensional time frequency space may be received by a funneling noise suppressor. Next, the power level in each of the plurality of mini-slots may be determined. The received signal may then be outputted. Outputting the received signal may comprises outputting the received signal with mini-slots muted in the received signal that have a power level less than a predetermined threshold.

20 Claims, 5 Drawing Sheets

UPSTREAM (US) FUNNELING NOISE SUPPRESSION

TECHNICAL FIELD

The present disclosure relates generally to echo cancellation.

BACKGROUND

A Hybrid Fiber-Coaxial (HFC) network is a broadband network that combines optical fiber and coaxial cable. It has been commonly employed globally by cable television operators. In a HFC cable network, television channels are sent from a cable system's distribution facility to local communities through optical fiber trunk lines. At the local community, a box translates the signal from a light beam to electrical signal, and sends it over cable lines for distribution to subscriber residences. The optical fiber trunk lines provide adequate bandwidth to allow future expansion and new bandwidth-intensive services.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
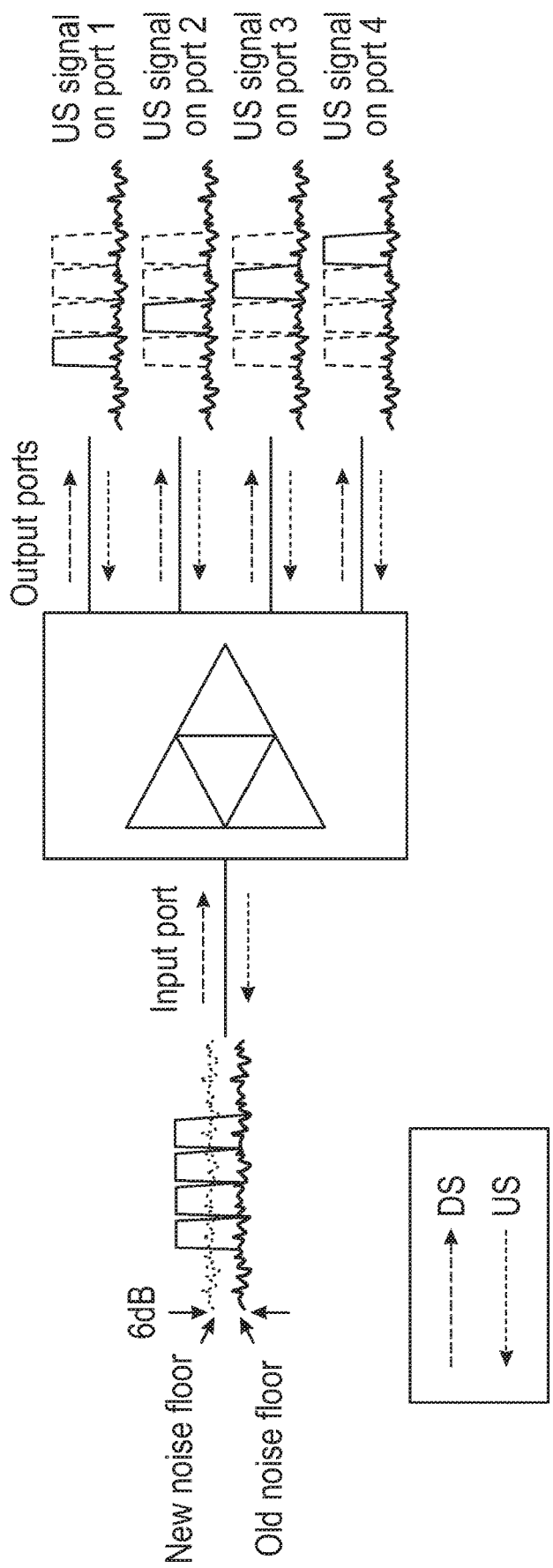
FIG. 1 illustrates Upstream (US) noise funneling.

Upstream (US) funneling noise suppression may be provided. First, a signal comprising a plurality of mini-slots in a two dimensional time frequency space may be received by a funneling noise suppressor. Next, the power level in each of the plurality of mini-slots may be determined. The received signal may then be outputted. Outputting the received signal may comprises outputting the received signal with mini-slots muted in the received signal that have a power level less than a predetermined threshold.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Multiple-system operators (MSOs) are operators of multiple cable or direct-broadcast satellite television systems. These systems may include HFC networks. To amplify upstream (US) signals and downstream (DS) signals in the HFC network, MSOs may use nodes deployed within the HFC. In the HFC network, a node may comprise a container that may house optical and electrical circuitry. An optical fiber cable or a coaxial cable may be connected to an input side of the node and a plurality of coaxial cables may be connected to a output side of the node. The input side of the node may be connect to a headend in the HFC network and the DS side of the node may be connected to Customer Premises Equipment (CPE) of subscribers to the HFC. Amplifiers may be used in the node to amplify upstream (US) signals and downstream (DS) signals. Embodiments of the disclosure may provide an US funneling noise suppression process for a Full Duplex (FDX) amplifier that may support FDX Data Over Cable Service Interface Specification (DOCSIS) operation.

FIG. 1 illustrates Upstream (US) noise funneling. As shown in FIG. 1, an FDX amplifier may be required for FDX N+M deployment, where N may represent an FDX node (e.g., a remote PHY device) and M may be the number of FDX amplifiers. An N+M network may employ a tree architecture where the FDX node has multiple output ports, and each output port may connect to an FDX amplifier. The FDX amplifier may comprise multiple output ports itself, and each output port may connect to a FDX amplifier, and so on so forth, until Cable Modems (CMs) are connected.

The US signals received on multiple output ports are combined, processed/amplified, and in the case of an FDX amplifier, sent out via the input port toward the node. The desired US signals coming from different ports occupy different spectrum as they come from different CMs, so they are never combined. However, the noise coming from different ports do combine. This leads to the US noise funneling effect where each combination, either in a node or an amplifier, degrades the US signal Signal-to-Noise Ratio (SNR) by x dB, where $x=10*\log 10(N)$, N is the number of output ports. For an N+2 FDX network, the US signal SNR may be degraded by approximately 12 dB if both node and amplifier have 4 output ports for example. A 12 dB degradation on the US SNR may not be acceptable. Accordingly, there may be a need of a process to alleviate this US noise funneling effect.

Figure 2:
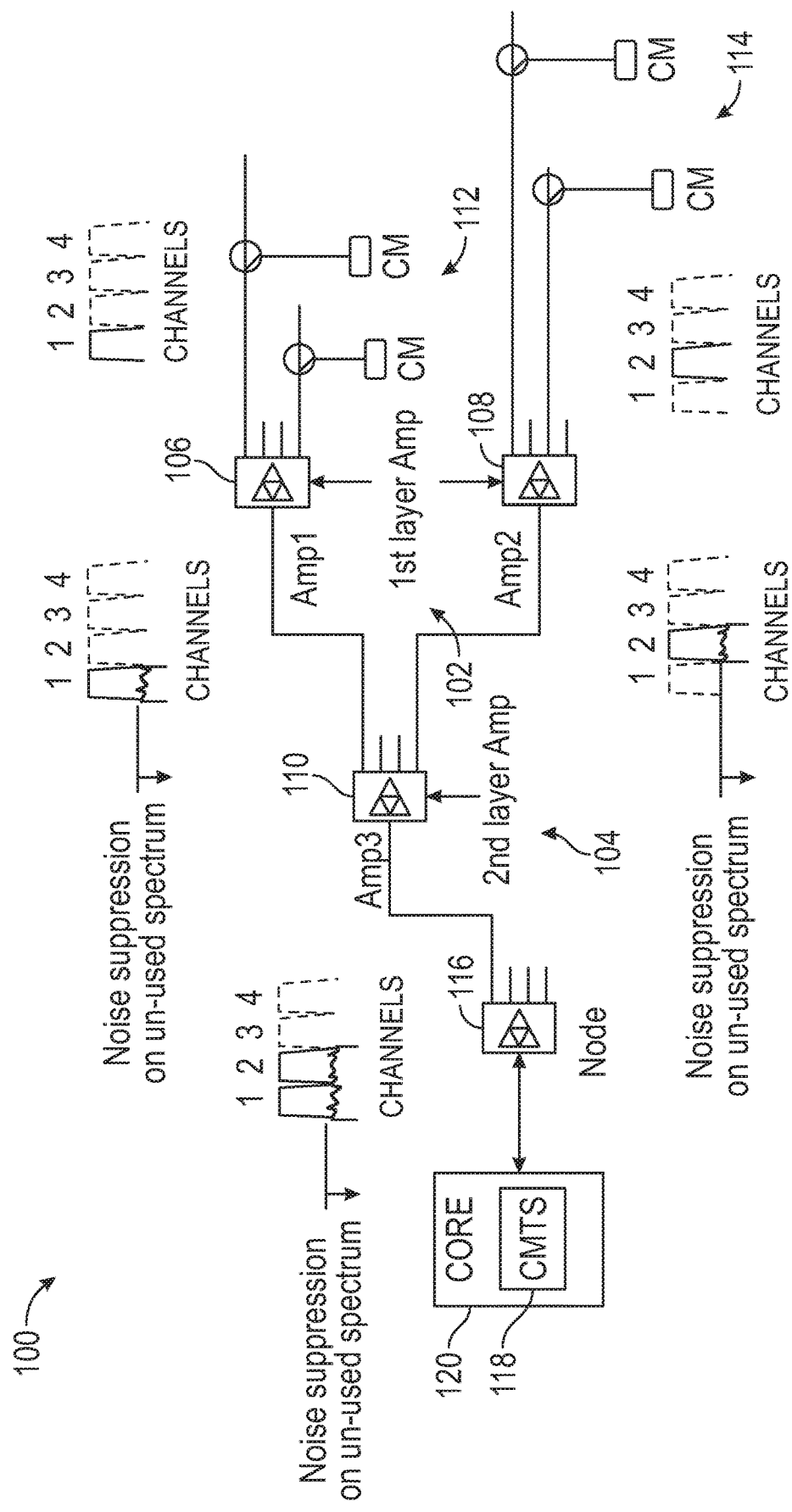
FIG. 2 is a block diagram of a system for providing upstream (US) funneling noise suppression.

FIG. 2 is a block diagram of a system 100 for providing Upstream (US) funneling noise suppression consistent with embodiments of the disclosure. System 100 may comprise a Distributed Access Architecture (DAA). As shown in FIG. 1, system 100 may comprise an N+2 system with a first layer of FDX amplifiers 102 and a second layer of FDX amplifiers 104. First layer of FDX amplifiers 102 may comprise a first FDX amplifier 106 and a second FDX amplifier 108. Second layer of FDX amplifiers 104 may comprise a third FDX amplifier 110. A first plurality of CMs 112 may be connected to first FDX amplifier 106 directly through taps. Similarly, a second plurality of CMs 114 may be connected to second FDX amplifier 108 directly through taps.

Third FDX amplifier 110 may connect to a node (i.e., a remote PHY device (RPD) 116). RPD 116 may connect to a Cable Modem Termination System (CMTS) 118 located in a core 120. Core 120 may comprise a Converged Cable Access Platform (CCAP) core and may include CMTS 118 that may include a scheduler.

CMTS 118 may comprise a device located in a service provider's (e.g., a cable company's) headend (i.e., core 120) that may be used to provide high speed data services, such as cable Internet or Voice-Over-Internet Protocol, to subscribers. Remote physical layer (i.e., RPHY) may comprise shifting or distributing the physical layer (i.e., PHY) of a conventional cable headend CMTS to fiber nodes (e.g., RPD nodes) in a network. RPD 116 may comprise circuity to implement the physical layer of the CMTS.

Figure 3:
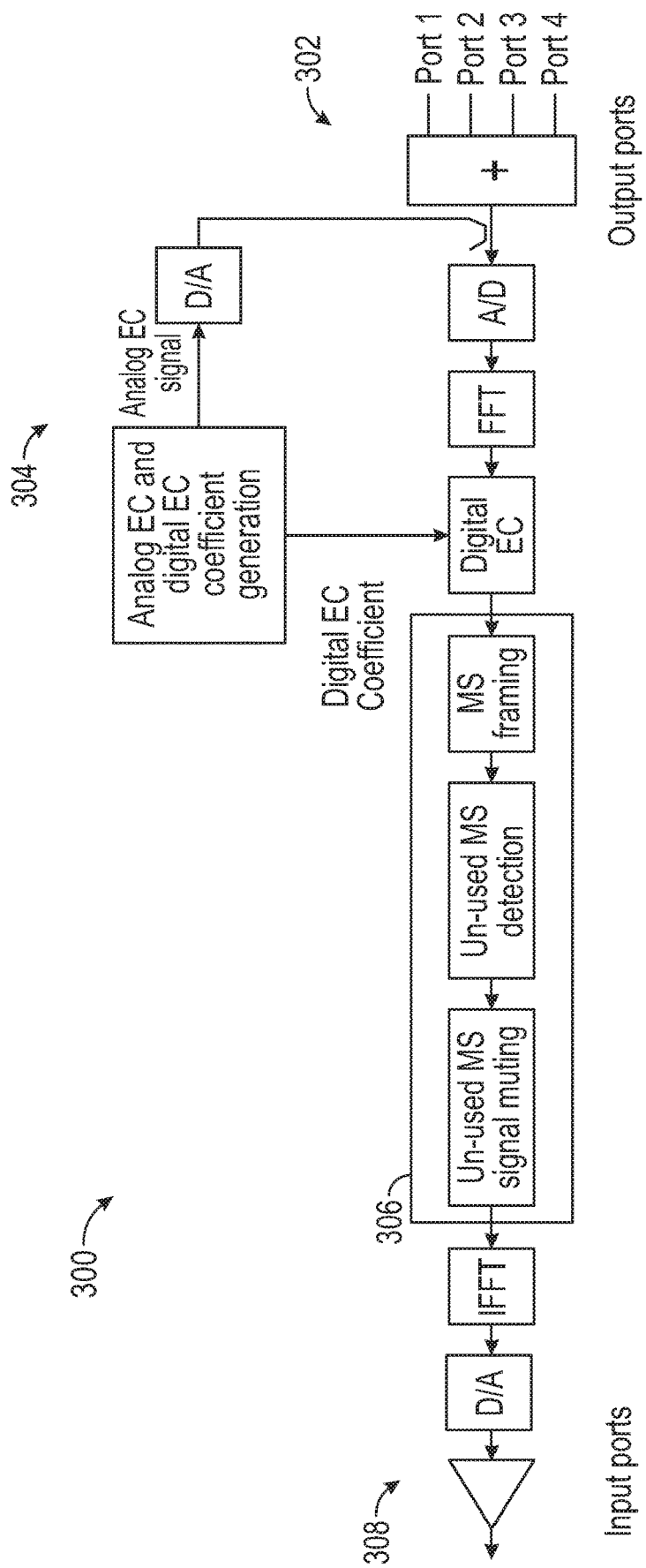
FIG. 3 is a block diagram of an Full Duplex (FDX) amplifier.

FIG. 3 shows an FDX amplifier 300 consistent with embodiments of the disclosure. First FDX amplifier 106, second FDX amplifier 108, and FDX third amplifier 110 may comprise FDX amplifier 300. As shown in FIG. 3, FDX amplifier 300 may comprise a plurality of output ports 302, a noise canceler section 304, a funneling noise suppressor 306, and an input port 308. Funneling noise suppressor 306 may also be deployed in a node such as RPD 116. As will be described in greater detail below, funneling noise suppressor 306 may provide Upstream (US) funneling noise suppression consistent with embodiments of the disclosure.

Elements described above of system 100 (e.g., first FDX amplifier 106, second FDX amplifier 108, third FDX amplifier 110, RPD 116, CMTS 118, FDX amplifier 300, and funneling noise suppressor 306) may be practiced in hardware and/or in software (including firmware, resident software, micro-code, etc.) or in any other circuits or systems. Elements of system 100 may be practiced in electrical circuits comprising discrete electronic elements, packaged or integrated electronic chips containing logic gates, a circuit utilizing a microprocessor, or on a single chip containing electronic elements or microprocessors. Elements of system 100 may also be practiced using other technologies capable of performing logical operations such as, for example, AND, OR, and NOT, including but not limited to, mechanical, optical, fluidic, and quantum technologies. As described in greater detail below with respect to FIG. 5, elements of system 100 may be practiced in a computing device 500.

Consistent with embodiments of the disclosure, noise funneling may be mitigated by suppressing noise, for example, on the unused US spectrum. The noise on the unused US spectrum may be suppressed on the input port (where the US signal is outputted) of (N−1)th layer amplifiers so, at an Nth layer amplifier, which is the next amplifier toward the node, the noises from multiple output ports (where the US is received from (N−1)th layer amplifiers) will not be added up.

Example embodiments consistent with the disclosure may be described with respect to system 100 of FIG. 2 (e.g., an N+2 network). As shown in FIG. 2, the US spectrum allocated to first plurality of CMs 112 and to second plurality of CMs 114 may comprise Channel 1 and Channel 2 respectively. At the input port of first FDX amplifier 106, the noise on Channel 2, 3, and 4, which are not used by first plurality of CMs 112, may be suppressed. Similarly, at the input port of second FDX amplifier 108, the noise on Channel 1, 3, and 4 may be suppressed. At third FDX amplifier 110, the US noise may not be added up when US signals from first FDX amplifier 106 and second FDX amplifier 108 are combined as the noises occupy different channels.

Figure 4:
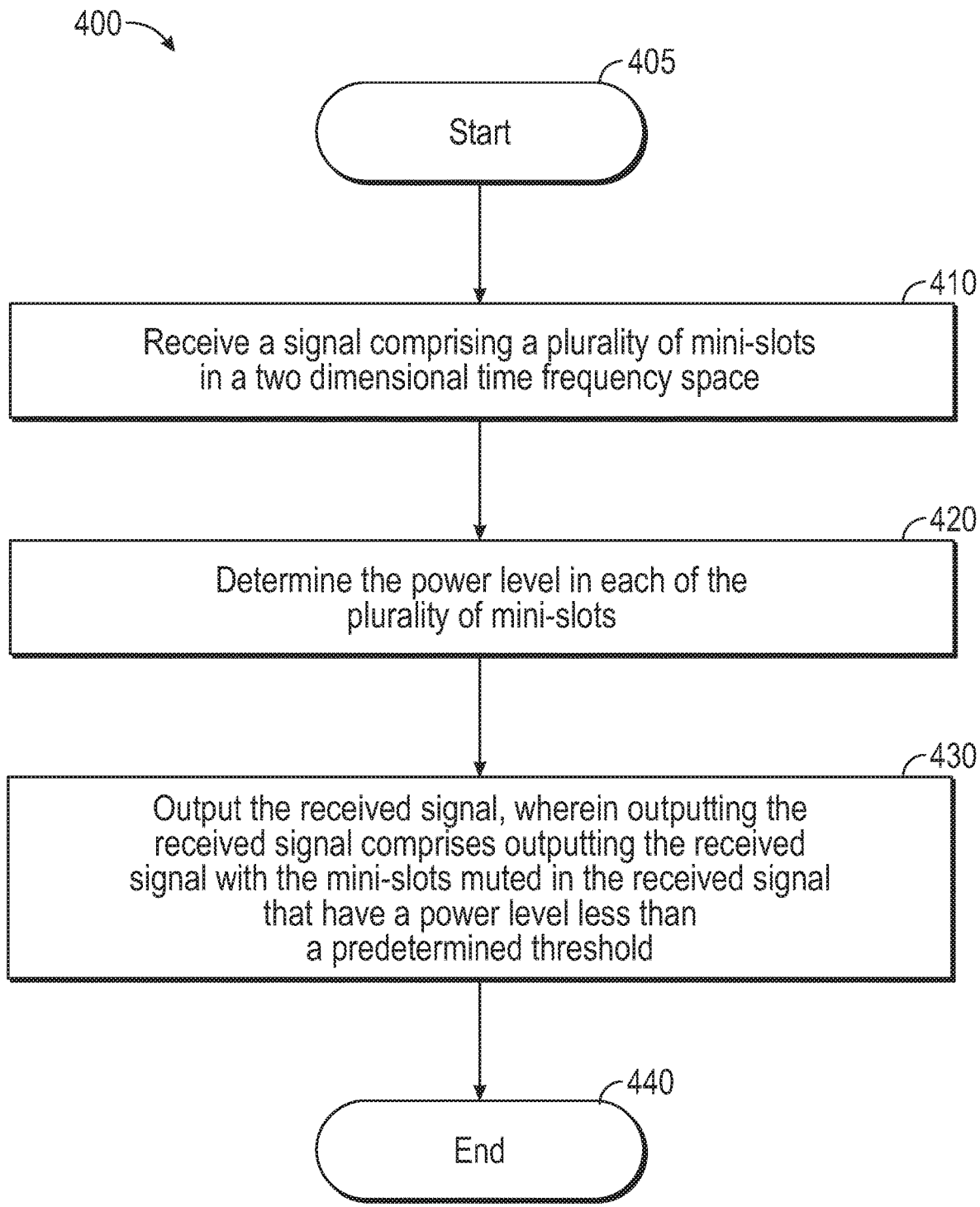
FIG. 4 is a flow chart of a method for providing upstream (US) funneling noise suppression.

FIG. 4 is a flow chart setting forth the general stages involved in a method 400 consistent with an embodiment of the disclosure for providing Upstream (US) funneling noise suppression. Method 400 may be implemented using a funneling noise suppressor 306 as described in more detail above with respect to FIG. 3. Ways to implement the stages of method 400 will be described in greater detail below.

Method 400 may begin at starting block 405 and proceed to stage 410 where funneling noise suppressor 306 may receive a signal comprising a plurality of mini-slots in a two dimensional time frequency space. As stated above, funneling noise suppressor 306 may be deployed in first FDX amplifier 106, second FDX amplifier 108, third FDX amplifier 110, and RPD 116. For example, the US allocation in the received signal may be in the unit of a mini-slot. There may be, for example, 237 min-slots in the spectrum of a 96 MHz FDX US channel. The US spectrum allocated to first plurality of CMs 112 may comprise Channel 1. The US signals received on the multiple output ports of first FDX amplifier 106 may be combined, processed/amplified, and sent out via the input port toward third FDX amplifier 110. Unfortunately, the noise from the unused Channels 2, 3, and 4, may combine as well in the received signal.

From stage 410, where funneling noise suppressor 306 receives the signal, method 400 may advance to stage 420 where funneling noise suppressor 306 may determine the power level in each of the plurality of mini-slots. For example, each mini-slot may comprise a plurality of subcarriers. The power level of one or more of the subcarriers may be used (e.g., averaged) to determine a power level of a given mini-slot.

Once funneling noise suppressor 306 determines the power level in each of the plurality of mini-slots in stage 420, method 400 may continue to stage 430 where funneling noise suppressor 306 may output the received signal. Outputting the received signal may comprise outputting the received signal with mini-slots muted in the received signal that have a power level less than a predetermined threshold. For example, at the input port of first FDX amplifier 106, the noise on Channel 2, 3, and 4, which are not used by first plurality of CMs 112, may be suppressed. The noise suppression may be done in the unit of a mini-slot, that is, for first FDX amplifier 106, the noise on any unused min-slots may be suppressed at the input port where the US signal is outputted.

The noise suppression on unused mini-slots may be done through power detection and muting. First, the power of each mini-slot may be detected. If the power is under a pre-selected threshold, the energy of that mini-slot may be muted (i.e., output nothing for that mini-slot). The pre-selected threshold may be x dB with respect to a globe noise floor, where x is a positive number. In other words, any mini-slot with energy <x dB above the globe noise may be considered as unused and thus muted. The globe noise floor may be determined through the long term average of the noises of all the unused mini-slots within certain bandwidth.

In the case of FDX operation, the US noise may come from the residue of the echoes (DS signal) caused by FDX operation. With a typical plant configuration and Radio Frequency (RF) device performance, the echo residue after echo cancellation may be around 30-40 dB below the signal level. This echo residue may be suppressed on unused mini-slots, otherwise, the effective SNR at a node may be degraded, for example, to 18-23 dB for N+2 networks (two layers of amp, four ports, each layer causes 6 dB SNR degradation). 18-23 dB SNR may not meet US performance targets.

The US noise funneling may be mitigated by suppressing the noise of unused mini-slots at the input port of FDX amplifiers. For the 1st layer amplifier, the US noises from multiple CMs may be added up at the output ports (where the US signals are inputted). This may not be an issue as the US noise funneling from multiple CMs has now been addressed. Embodiments of the disclosure may provide a CM noise floor that may be so low that even the noise from multiple CMs are combined, the effective in-band SNR may still be sufficient to support $2k$ Quadrature Amplitude Modulation (QAM) for example. After funneling noise suppressor 306 outputs the received signal in stage 430, method 400 may then end at stage 450.

Figure 5:
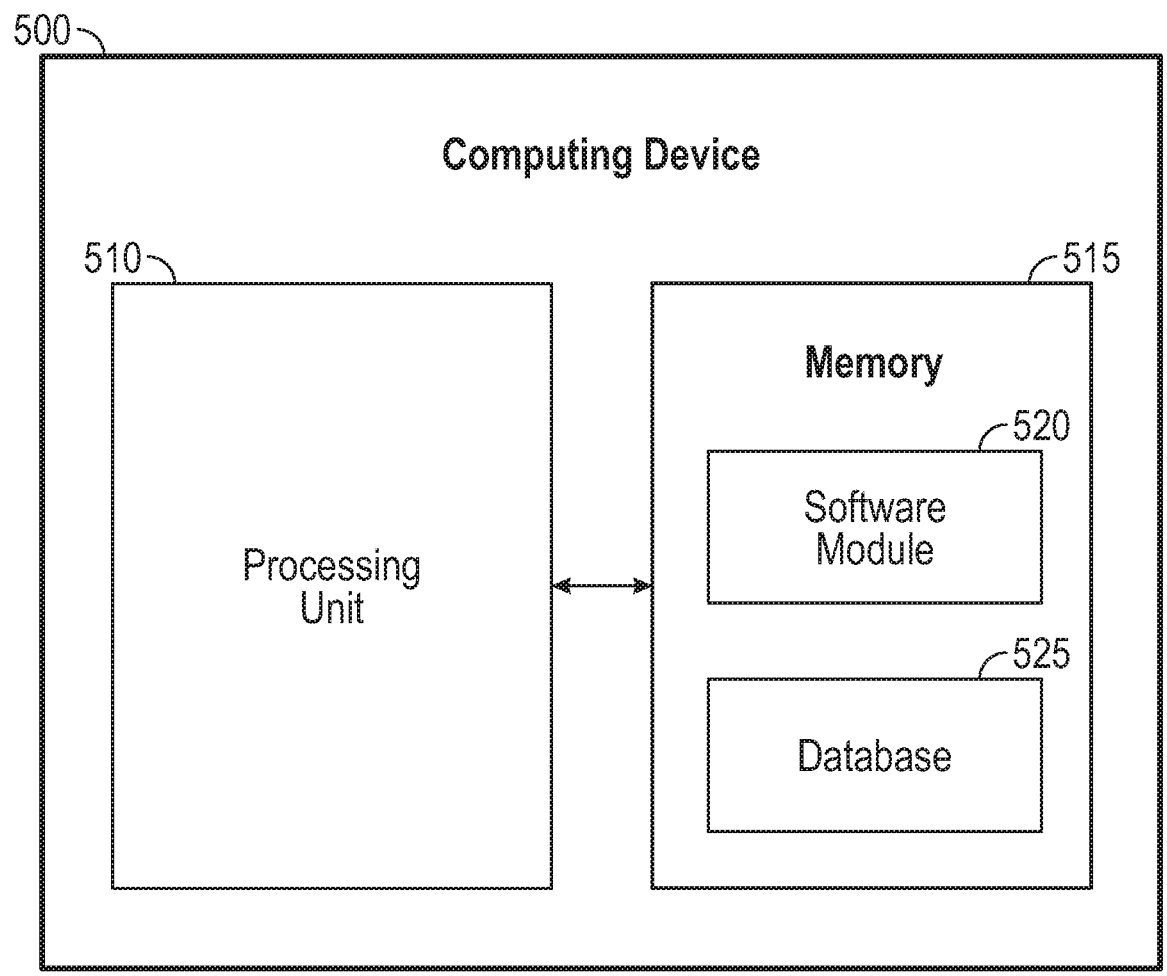
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing Upstream (US) funneling noise suppression, including for example, any one or more of the stages from method 400 described above with respect to FIG. 4. Computing device 500, for example, may provide an operating environment for first FDX amplifier 106, second FDX amplifier 108, third FDX amplifier 110, RPD 116, CMTS 118, FDX amplifier 300, and funneling noise suppressor 306. First FDX amplifier 106, second FDX amplifier 108, third FDX amplifier 110, RPD 116, CMTS 118, FDX amplifier 300, and funneling noise suppressor 306 may operate in other environments and is not limited to computing device 500.

Computing device 500 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 2 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
receiving, by a funneling noise suppressor, a signal comprising a plurality of mini-slots in a two dimensional time frequency space;
determining a power level in each of the plurality of mini-slots;
comparing the power level in each of the plurality of mini-slots with a predetermined threshold;
outputting the received signal based on comparing the power level in each of the plurality of mini-slots with the predetermined threshold, wherein outputting the received signal based on the power level in each of the plurality of mini-slots with the predetermined threshold comprises outputting the received signal with mini-slots muted in the received signal that have a power level less than the predetermined threshold; and
providing the received signal with the mini-slots that have the power level less than the predetermined threshold muted to a second level funneling noise suppressor, wherein the second level funneling noise suppressor is connected to a plurality of first level funneling noise suppressors in a tree structure.

2. The method of claim 1, wherein predetermined threshold is relative to a global noise floor.

3. The method of claim 2, wherein the global noise floor comprises an average of noises of all unused mini-slots within a predetermined bandwidth.

4. The method of claim 1, wherein the muted mini-slots correspond to unused spectrum.

5. The method of claim 1, wherein the received signal comprises a Full Duplex (FDX) Data Over Cable Service Interface Specification (DOCSIS) 3.1 specification compliant upstream signal.

6. The method of claim 1, wherein the funneling noise suppressor is disposed in a Full Duplex (FDX) amplifier disposed in an Hybrid Fiber-Coaxial (HFC) network.

7. The method of claim 1, wherein the received signal corresponds to upstream signals received from a plurality of Cable Modems (CMs).

8. A system comprising:
a memory storage; and
a processing unit coupled to the memory storage, wherein the processing unit is operative to:
receive a signal comprising a plurality of mini-slots in a two dimensional time frequency space;
determine a power level in each of the plurality of mini-slots;
compare the power level in each of the plurality of mini-slots with a predetermined threshold; and
output the received signal based on comparing the power level in each of the plurality of mini-slots with the predetermined threshold, wherein the processing unit being operative to output the received signal based on the power level in each of the plurality of mini-slots with the predetermined threshold comprises the processing unit being operative to output the received signal with mini-slots muted in the received signal that have a power level less than the predetermined threshold; and
provide the received signal with the mini-slots that have the power level less than the predetermined threshold muted to a second level funneling noise suppressor, wherein the second level funneling noise suppressor is connected to a plurality of first level funneling noise suppressors in a tree structure.

9. The system of claim 8, wherein predetermined threshold is relative to a global noise floor.

10. The system of claim 9, wherein the global noise floor comprises an average of noises of all unused mini-slots within a predetermined bandwidth.

11. The system of claim 8, wherein the muted mini-slots correspond to unused spectrum.

12. The system of claim 8, wherein the received signal comprises a Full Duplex (FDX) Data Over Cable Service Interface Specification (DOCSIS) 3.1 specification compliant upstream signal.

13. The system of claim 8, wherein the received signal corresponds to upstream signals received from a plurality of Cable Modems (CMs).

14. A non-transitory computer-readable medium that stores a set of instructions which when executed perform a method comprising:
receiving, by a tunneling noise suppressor, a signal comprising a plurality of mini-slots in a two dimensional time frequency space;
determining a power level in each of the plurality of mini-slots;
comparing the power level in each of the plurality of mini-slots with a predetermined threshold;
outputting the received signal based on comparing the power level in each of the plurality of mini-slots with the predetermined threshold, wherein outputting the received signal based on the power level in each of the plurality of mini-slots with the predetermined threshold comprises outputting the received signal with mini-slots muted in the received signal that have a power level less than the predetermined threshold; and
providing the received signal with the mini-slots that have the power level less than the predetermined threshold muted to a second level funneling noise suppressor, wherein the second level tunneling noise suppressor is connected to a plurality of first level funneling noise suppressors in a tree structure.

15. The non-transitory computer-readable medium of claim 14, wherein predetermined threshold is relative to a global noise floor.

16. The non-transitory computer-readable medium of claim 15, wherein the global noise floor comprises an average of noises of all unused mini-slots within a predetermined bandwidth.

17. The non-transitory computer-readable medium of claim 14, wherein the muted mini-slots correspond to unused spectrum.

18. The non-transitory computer-readable medium of claim 14, wherein the received signal comprises a Full Duplex (FDX) Data Over Cable Service Interface Specification (DOCSIS) 3.1 specification compliant upstream signal.

19. The non-transitory computer-readable medium of claim 14, wherein the tunneling noise suppressor is disposed in a Full Duplex (FDX) amplifier disposed in an Hybrid Fiber-Coaxial (FIFC) network.

20. The non-transitory computer-readable medium of claim 14, wherein the received signal corresponds to upstream signals received from a plurality of Cable Modems (CMs).

* * * * *